United States Patent [19]

Tsao et al.

[11] Patent Number: 4,533,925

[45] Date of Patent: Aug. 6, 1985

[54] INK JET PRINTER WITH NON-UNIFORM RECTANGULAR PATTERN OF PRINT POSITIONS

[75] Inventors: Sherman H. Tsao, Plano; Kenneth T. Zeiler, Richardson, both of Tex.

[73] Assignee: The Mead Corporation, Dayton, Ohio

[21] Appl. No.: 623,693

[22] Filed: Jun. 22, 1984

[51] Int. Cl.[3] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,701,998 | 10/1972 | Mathis | 346/75 |
| 4,060,804 | 11/1977 | Yamada | 346/1 |
| 4,085,409 | 4/1978 | Paranjpe | 346/75 |
| 4,091,390 | 5/1978 | Smith et al. | 346/75 |
| 4,115,788 | 9/1978 | Takano et al. | 346/75 |
| 4,122,458 | 10/1978 | Paranjpe | 346/75 |
| 4,219,822 | 8/1980 | Paranjpe | 346/75 |
| 4,272,771 | 6/1981 | Furukawa | 346/75 |
| 4,467,366 | 8/1984 | Bobick et al. | 358/296 |

*Primary Examiner*—E. A. Goldberg

*Assistant Examiner*—Gerald E. Preston

*Attorney, Agent, or Firm*—Biebel, French & Nauman

[57] ABSTRACT

An ink jet printer for printing a print image on a moving print medium by selectively depositing ink drops at a plurality of print positions arranged in a non-uniform rectangular grid on the medium, such that a plurality of print lines are formed on the medium, includes a print head for generating a plurality of jet drop streams directed at the medium, and arranged in a row which is skewed with respect to the direction of movement of the medium. The drops in each stream are selectively charged and deflected in a direction perpendicular to the row. Each stream services a plurality of print positions and prints a band of print lines. Drops deposited along adjacent print lines by adjacent jets overlap more than drops deposited along adjacent print lines by the same jet.

10 Claims, 9 Drawing Figures

INK JET PRINTER WITH NON-UNIFORM RECTANGULAR PATTERN OF PRINT POSITIONS

BACKGROUND OF THE INVENTION

The present invention relates generally to the field of fluid drop generation and the application thereof to jet drop recorders of the type shown in U.S. Pat. No. 3,701,998 to Mathis, issued Oct. 31, 1972. In recorders of this type, one or more rows of orifices in a plate receive an electrically conductive recording fluid, such as a water base ink, from a pressurized fluid manifold and eject the fluid in parallel streams. The streams are broken up into drops as a result of the application of a series of travelling waves to the plate or as a result of other mechanical stimulation, such as the application of compression waves to the fluid in the manifold. Graphic reproduction in recorders of this type is accomplished by selectively charging and deflecting some of the drops in each of the streams and, thereafter, depositing drops on a moving print receiving medium, such as a moving web or moving sheets of paper.

Charging of the drops is accomplished by the application of charge control signals to charging electrodes near the edge of the drop streams. Charges are induced in the ends of fluid filaments emerging from the orifices by the charge control signals. As the drops separate from their parent fluid filaments, they carry a portion of the charge applied by the charging electrodes. Thereafter, the drops pass through one or more electrostatic fields which have no effect on the uncharged drops but which cause the charged drops to be deflected in proportion to the level of charge which they carry. Drops which are not to be printed are charged sufficiently such that they are deflected to a catcher which services all of the drop streams.

One problem encountered in the field of ink jet printers has been attaining sufficient image resolution. Since a discrete number of drops are applied to a print medium to form the images, it is clear that image definition may be improved by increasing the number of drops and providing a proportionate increase in data handling capability. If, however, only one print position on the print medium is serviced by each orifice, the number of print positions per unit width and, therefore, the resolution of the image in the direction transverse to the direction of medium movement is limited by the minimum dimensions required between adjacent orifices. The approach taken in the Mathis device is to provide two rows of drop streams, with each row of streams being perpendicular to the direction of medium movement, and the drops from one row of the drop streams servicing print positions which interlace with those serviced by the other row of drop streams. The charging of drops in the two rows is timed such that printing from the two rows of streams is in registration. The separation between adjacent streams in each of the rows is therefore twice that which would be required in a one row printer of comparable resolution.

U.S. Pat. No. 4,085,409, issued Apr. 18, 1978, to Paranjpe, discloses a printer which is somewhat similar in construction to that of the Mathis printer. The rows of jets in the Paranjpe '409 printer are positioned along parallel lines which are inclined to the direction of web movement. Drops in each of the jet drop streams are selectively charged to any of several charge levels such that they are deflected to service a number of print positions. The inclined printer of Paranjpe '409 provides improved resolution across the width of the web, both as a result of positioning the rows of jets along lines which are inclined with respect to the movement of the print web and by virtue of the fact that each jet services a number of print positions. Because of the deflection electrode position in the Paranjpe printer, the deflection fields are created by electrodes which do not extend between adjacent jets. The inter-jet spacing is, therefore, not limited by the deflection electrode structure.

In a printer, such as shown in the Paranjpe '409 patent, the drops from the drop streams may be accurately deposited at print positions on the medium and thus provide a high resolution print image across the width of the medium, providing that each of the jets is accurately positioned along the line of jets. Should one of the jets in such a system be slightly crooked, the band of print lines which it services will be laterally displaced from the desired position with the result that a small gap between the band serviced by the crooked jet and one of the adjacent bands of print lines will be produced in which no printing may be accomplished. Since these unprinted areas will appear as white streaks running parallel to the direction of movement of the print medium, even small interband gaps will be noticeable and will detract significantly from the appearance of the final print image. Since all of the print lines serviced by a jet are shifted to the same degree when the jet becomes crooked, however, a misaligned jet does not produce white streaks between the print lines serviced by the jet.

U.S. Pat. No. 4,060,804, issued Nov. 29, 1977, to Yamada, discloses an ink jet printing device in which two jets are provided for printing at two adjacent groups of print positions. In order to minimize the possibility of a gap or other deterioration along the boundary of the bands of print lines serviced by the two jets, the jets are positioned such that the print lines adjacent the boundary in each of the groups are serviced by the drops from the respective jets which are deflected the least. This arrangement is said to minimize the likelihood of a white streak occurring as a result of errors in the deflection of the drops. If one or both of the jets are crooked, however, this scheme will not provide an improvement in image quality.

U.S. Pat. No. 4,219,822, issued Aug. 26, 1980, to Paranjpe, shows an ink jet printer in which drops of ink from a plurality of jet drop streams, arranged in a row, are selectively deposited on a moving print receiving medium. The row of streams is inclined with respect to the direction of movement of the medium. The drops from each stream are deflected in a direction perpendicular to the row of streams to a plurality of print positions. Drops deposited at each print position define a corresponding print line along the print receiving medium. At least two of the print lines serviced by each jet drop stream overlap substantially with print lines serviced by adjacent jet drop streams. Thus, each jet drop stream services a band of print lines with at least one print line on each edge of the band overlapping with those of adjacent bands. This arrangement makes the occurrence of white streaks due to crooked jets much less likely. In order to prevent distortion of the image, however, the same image data is used to control printing along the sets of overlapping print lines.

It will be appreciated that the Paranjpe '822 device is limited in that two print lines, serviced by each jet, print image information which is redundantly printed by adjacent jets as well. Further, Paranjpe '822 teaches providing the same number of drops per inch in both vertical and horizontal directions which constrains the angle of the row of jets unduly.

It is seen, therefore, that a need exists for a printer in which each jet services a number of print positions forming a band of print lines along the print web and in which the effects of a crooked jet on the resulting print image are minimized.

SUMMARY OF THE INVENTION

An ink jet printer for depositing drops of ink on a moving print medium at print positions such that a print image is formed on the print medium, with the drops deposited at each print position defining a print line, includes means for generating a plurality of jet streams, which streams are evenly spaced along a row. A means is provided for moving the print medium relative to the jet row such that the direction of movement of the print medium is oblique with respect to the jet row. Finally, a means is provided for selectively deflecting drops in each of the jet streams to a plurality of print positions in a direction which is perpendicular with respect to the jet row. A number of the print lines serviced by each jet stream overlap those serviced by adjacent jet streams. The drops are deposited on the medium in a rectangular pattern with the spacing between drops along a print line differing from the spacing between adjacent print lines serviced by a single jet stream, and with the spacing between adjacent print lines serviced by a single jet stream being greater than the spacing between print lines serviced by different jet streams.

The means for selectively deflecting drops may include means for selectively charging drops in the jet streams to a plurality of M print charge levels, each such print charge level corresponding to an associated print position serviced by each jet stream.

The amount of overlap B.O. between adjacent print lines serviced by adjacent jet streams may be defined by: $B.O.=D_S-[C-(M-1)S_H]$. $D_S$ = the diameter of a dot formed by depositing one or more drops at a print position; C = the distance in a direction perpendicular to the direction of movement of the medium between adjacent jet streams; and $S_H$ = the distance between adjacent print positions serviced by a single jet stream in a direction perpendicular to the direction of movement of the medium.

The ratio between $S_H$ and $S_V$, the distance between adjacent print positions within a print line, is defined by: $S_H/S_V=K(n\pm 1/M)(S_V/C)$, where K = an integer defining the number of integer $S_V$ spacings between adjacent jet streams in a direction parallel to the direction of movement of the medium; n = an integer defining the number of integer $S_V$ spacings between print positions serviced sequentially by a single jet stream; and the sign of 1/M is a plus if print positions are successively serviced by each jet stream generally in the direction of medium movement and a minus if print positions are successively serviced by each jet stream generally opposite to the direction of medium movement.

The means for selectively deflecting drops may further include means for providing a static electrical deflection field through which the jet streams pass, with the field substantially perpendicular to the jet stream row. The means for selectively deflecting drops may also include a drop catcher extending parallel to the row for catching drops which are not to be deposited on the medium.

The angle of the row with respect to an imaginary line perpendicular to the direction of medium movement may be defined by $\gamma$ equals $\tan^{-1}[S_H/S_V(n\pm 1/M)]$ and $\gamma=\tan^{-1}(KS_V/C)$.

Accordingly, it is an object of the present invention to provide an ink jet printer in which a plurality of print positions are serviced by each of a plurality of jet drop streams, with the streams being arranged along a row inclined with respect to the direction of movement of a print receiving medium and with the deposit of drops at the print positions resulting in drops being positioned on the print receiving medium in a non-linear rectangular grid pattern; to provide such a printer in which the overlap between print lines serviced by adjacent jet drop streams is greater than the overlap between print lines serviced by the same jet drop stream, whereby jet drop stream misalignment is compensated; and to provide such a printer in which the spacing of the grid pattern in a direction parallel to the direction of the movement of the medium differs from the spacing of the grid pattern in a direction perpendicular thereto.

Other objects and advantages of the invention will be apparent from the following description, the accompanying drawings and the appended claims.

DETAILED DESCRIPTION OF THE PREFERRED EMBODIMENTS

Figure 1:
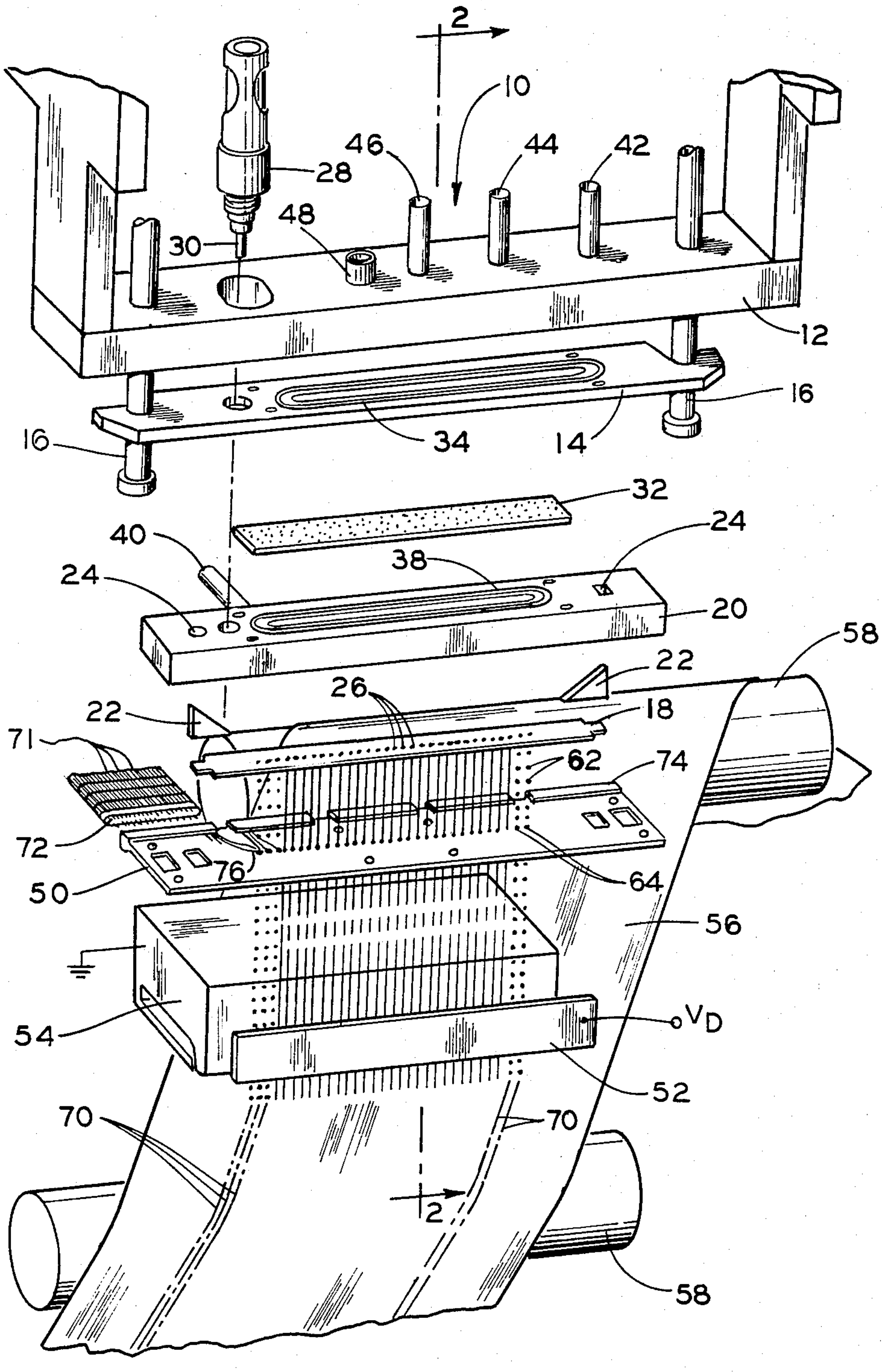
FIG. 1 is a diagrammatic exploded perspective view of an ink jet printer constructed according to the present invention.

The present invention relates to an ink jet printer for printing text and graphics on a moving print receiving medium, such as a paper web or sheet. FIG. 1 is a diagrammatic exploded perspective view illustrating a printer constructed according to the present invention. The various elements of a head assembly 10 are assembled for support by a support bar 12. Assembly thereto is accomplished by attaching the elements by means of machine screws (not shown) to a clamp bar 14 which, in turn, is connected to the support bar 12 by means of clamp rods 16.

The print head comprises an orifice plate 18 soldered, welded or otherwise bonded to fluid supply manifold 20 with a pair of wedge-shaped acoustical dampers 22 therebetween. Orifice plate 18 is preferably formed of a relatively stiff material which is also relatively thin to provide the required flexibility for direct contact stimulation. Preferably dampers 22 are cast in place by pouring polyurethane rubber or other suitable damping material through openings 24 while tilting manifold 20 at an appropriate angle from the vertical. This is a two-step operation as dampers 22 require tilting in opposite directions.

Orifice plate 18 defines a row of orifices 26 and is stimulated by a stimulator 28 which is threaded into clamp bar 14 to carry a stimulation probe 30 through the manifold 20 into direct contact with plate 18. Orifice plate 18, manifold 20, clamp bar 14, together with filter plate 32 and O-rings 34, 36 and 38 (see FIG. 2) comprise a clean assembly which may be preassembled and kept closed to prevent dirt or foreign material from reaching and clogging orifices 26. Conduit 40 may be provided for flushing the clean package. Service connections for the recording head include a coating fluid supply tube 42, air exhaust and inlet tubes 44 and 46, and a tube 48 for connection to a pressure transducer (not shown).

Other major elements of the printer include a charge ring plate 50, an electrically conductive deflection electrode 52, and a catcher 54. A print receiving medium, such as print web 56, is moved past the printer over rolls 58 by a conventional web drive mechanism (not shown). Alternatively, the print web 56 may be stationary and the printer transported past the web 56. In either case, a means is provided for effectuating relative movement between the web and the printer.

Figure 2:
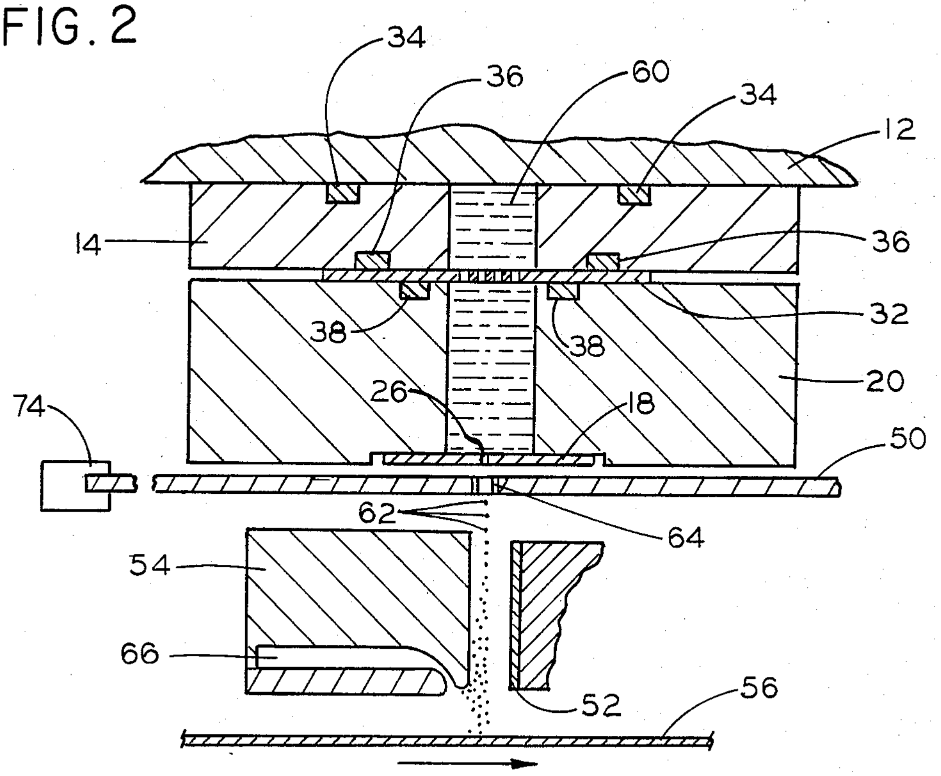
FIG. 2 is a section view taken generally along the line 2—2 in FIG. 1, looking generally left to right.

The ink jet printer of FIG. 1 is shown in cross section in FIG. 2. As therein illustrated, conductive ink 60 flows downwardly through orifices 26 forming a row of drop jets which are directed toward the print web 56. Each jet drop stream consists of a plurality of drops 62. Drops 62 are selectively charged by means of charge rings 64 and are directed into the catcher 54 or onto the moving print web, striking the web at one of a plurality of print positions. Switching of drops between "catch" and the various print position trajectories is accomplished by electrostatic deflection, as hereinafter described.

Formation of drops 62 is closely controlled by application of a constant frequency, controlled amplitude, stimulating disturbance to each of the jet streams emanating from orifice plate 18. Disturbances for this purpose may be set up by operating transducer 28 to vibrate probe 30 at constant amplitude and frequency against plate 18. This causes a continuing series of bending waves to travel the length of plate 18, each wave producing a drop stimulating disturbance to each of the jets as it passes over the orifices 26 in succession. Dampers 22 prevent reflection and repropogation of these waves. Accordingly, each jet comprises an unbroken fluid filament and a series of uniformly sized and regularly occurring drops, all in accordance with the well-known Rayleigh jet break-up phenomenon. Alternatively, stimulation may be provided by applying pressure waves to the ink in manifold 20 by an arrangement such as shown, for example, in U.S. Pat. No. 4,122,458, issued Oct. 24, 1978, to Paranjpe.

As each drop 62 is formed, it is exposed to the charging influence of the associated charge ring 64. If the drop is to be deflected and caught, an electrical charge of predetermined charge level is applied to the associated charge ring 64 during the instant of drop formation. This causes an electrical charge to be induced in the tip of the fluid filament and carried away by the drop. As the drop traverses the deflecting field set up between the deflection electrode 52, which is held at an elevated potential $V_d$, and the face of the grounded catcher 54, it is deflected to strike the catcher. The drop will then run down the face of the catcher and be ingested into cavity 66. Drop ingestion may be promoted by application of a suitable vacuum to the ends of the catcher 54.

When a drop 62 is to be directed to a print position on the web 56, the drop is not charged or alternatively is charged to a level which is less than that which would cause it to be deflected and caught by the catcher 54. The drop will therefore be deflected slightly in a direction which is perpendicular to the jet row, such that it will strike the print web at a selected print position. As can be seen in FIG. 1, the print web 56 is moved past the jet row in a direction which is oblique with respect to the row. Each of the drops in the jet drop streams may be selectively deflected in a direction which is perpendicular with respect to the jet row. The amount of deflection will be a direct function of the charge carried by the individual drop.

Figure 3B:
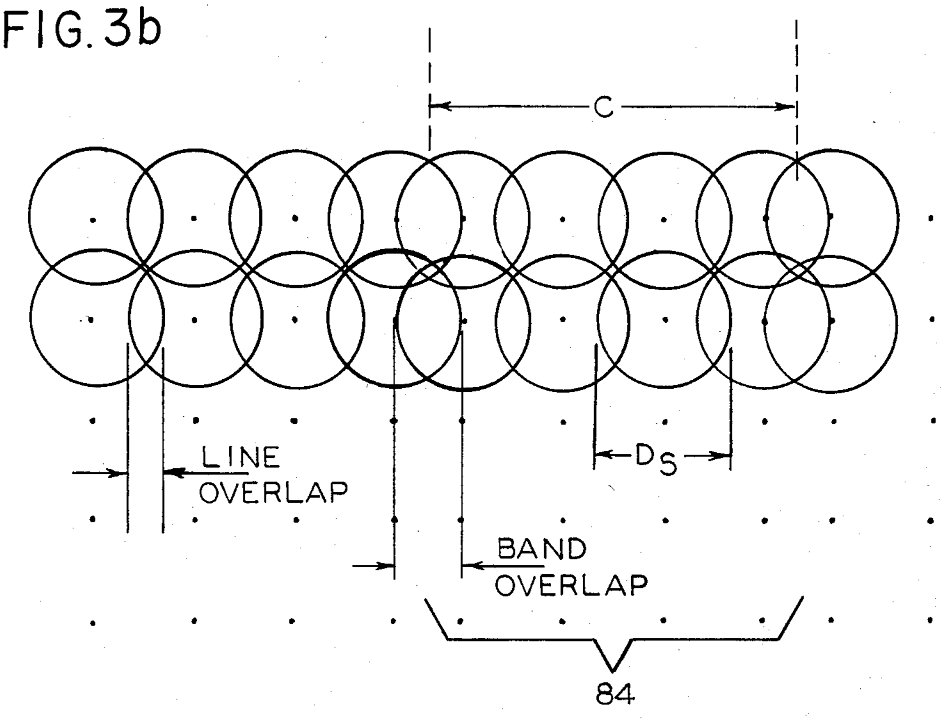
FIG. 3*b* is an enlarged plan view of the non-linear rectangular grid pattern in which the drops are placed on the print receiving medium.
Figure 3A:
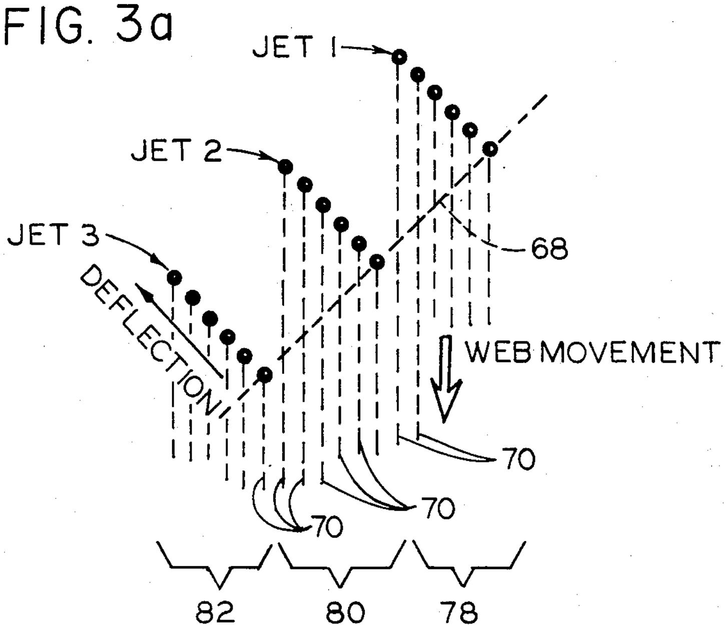
FIG. 3*a* is a plan view illustrating the print positions serviced by adjacent jet drop streams.

FIG. 3*a* is a diagrammatic plan view of a portion of the print receiving medium, directly beneath the print head assembly 10, illustrating generally the pattern of deflection of the drops in each of the jets as seen from a point above the web 56. The jets are positioned directly above the print positions illustrated along line or row 68.

When a drop from a jet receives no charge, it will strike the print web at the associated print position on line 68. The addition of a small charge to a drop will cause the drop to be deflected in a direction perpendicular to the row of jets to an adjacent print position. Successively larger charge levels on the drops will result in successively greater deflection of drops outward from the print positions on line 68. As the print web moves past the printer, the drops deposited at each print position will form an associated print line, illustrated diagrammatically in FIG. 3*a* at 70. Illustrated is a printer in which each jet stream services six print positions. It will be appreciated that since the drops making up the print image along a line transverse to the direction of web movement are deposited on the web at different times by the jets in the jet row, the electronic control data defining the print image along such a line will necessarily have to be re-ordered before it is used to control the deposit of drops at the print positions.

Charging of drops is accomplished by setting up an appropriate electrical potential difference between orifice plate 18 (or any conductive structure in the electrical contact with the coating fluid supply) and each of the charge rings 64. These potential differences are created by grounding plate 18 and applying appropriately timed voltage pulses to wires 71 via connectors 72 (only one such connector being illustrated in FIG. 1). Connectors 72 are plugged into receptacles 74 at the edge of the charge ring plate 50 and deliver the required voltage pulses over printed circuit lines 76 to charge rings 64. Charge ring plate 50 is fabricated from insulative material and charge rings 64 may be merely coatings of conductive material lining the surfaces of orifices in the charge ring plate.

Deflection of drops 62 which are charged to a catch charge level, or a lesser charge level, is accomplished by creating an electrical field between the deflection electrode 52 and the catcher 54. The deflection electrode 52 may be charged to a deflection potential level $V_d$, thereby setting up a deflection field between the electrode 52 and the grounded catcher 54. The charged drops in the jet streams may carry a charge which is of the same polarity as the deflection potential $V_d$, so that the drops are deflected away from the electrode 52 toward the catcher 54. Alternatively, some or all of the drops could receive charges of opposite polarity. In such a case, however, the position of the catcher 54 and the electrode 52 would necessarily be adjusted with respect to the drop streams to provide for selective catching of the drops.

It has been found that, if desired, more than one drop may be deposited at each print position on the web. Two successive drops directed to the same print position will tend to pile up and spread in all directions, behaving much like one drop of larger volume. It will be appreciated that the web speed must be reduced somewhat with a multiple drop per print position printing arrangement so that movement of the web between deposit of successive drops will not be substantial.

Each jet drop stream deposits drops at print positions arranged such that it prints along a band of print lines 70. Thus, jet 1 services print lines in band 78, jet 2 services print lines in band 80, and jet 3 services print lines in band 82. As pointed out above, if a jet becomes crooked, all of the print lines serviced by the jet are shifted by the same amount. Therefore, the relative position between print lines serviced by the misaligned jet remains constant and the image along the band of print lines is not significantly distorted. Unprinted gaps between the bands printed by adjacent jets may appear as a result of crooked jet drop streams, however, and it is to such distortions that the present invention is directed.

Basically, the possibility of unprinted inter-band gaps occurring is reduced by utilizing a non-linear rectangular grid pattern of print positions in which there is greater overlap between print lines serviced by adjacent jet drop streams than there is between print lines serviced by the same jet drop stream. FIG. 3b illustrates such a grid pattern of print positions. Each print position is denoted by a small solid black dot, with the size of the ink dot resulting from the deposit of one or more ink drops at the print position being illustrated by a circle having the print position at its center. Note that the width C of the band 84 of print lines is measured to the center of print line overlaps with adjacent bands. Note further that the interband line overlap exceeds the intraband line overlap. As a result, a misdirected jet drop stream is less likely to produce a white streak along the printed image as a result of an unprinted gap between bands of print lines.

Referring to FIGS. 4–8, for a rectangular print position grid pattern, the two equations which govern the angle of the row 68 of jet drop streams with respect to an imaginary line perpendicular to the direction of medium movement are:

$$\tan\gamma = S_H/S_V(n+1/M)$$

and $$\tan\gamma = KS_V/C.$$

Figure 4:
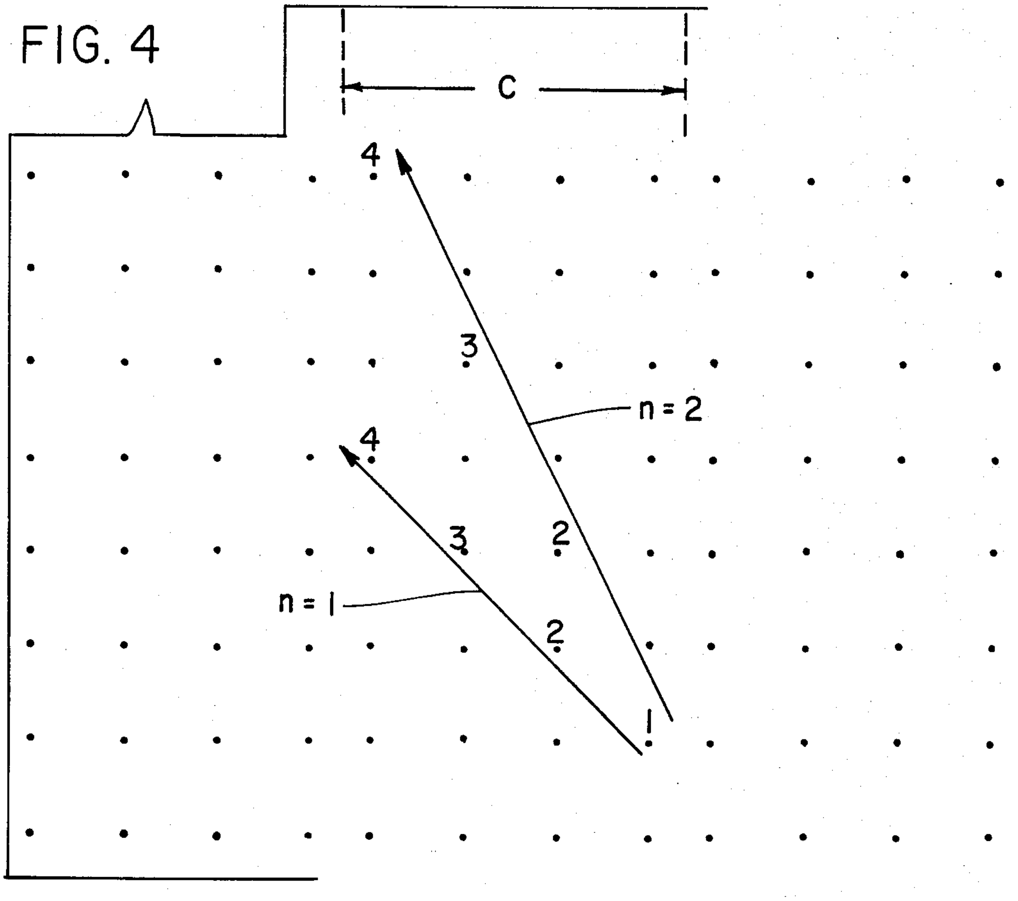
FIG. 4 is an enlarged plan view of the non-linear rectangular grid pattern in which the drops are placed on the print receiving medium, graphically illustrating the term n.

The meaning of the variables is graphically defined in the drawings. $S_H$ is the horizontal displacement between adjacent print positions in a band. $S_V$ is the vertical displacement between adjacent print positions in a print line. M is the number of print positions serviced by each jet drop stream (six in the case of FIG. 3a and four in the case of FIGS. 4–8). As illustrated in FIG. 4, n is the number of rows of print positions between the print positions successively serviced by each jet, plus 1. Stated another way, n is equal to an integer defining the number of spacings $S_V$ between print positions serviced sequentially by a single jet stream. K is the vertical displacement between adjacent jet drop streams divided by $S_V$. Stated another way, K is an integer defining the number of integer $S_V$ spacings between adjacent jet drop streams in a direction parallel to the direction of movement of the medium.

It will be appreciated that the overlap between bands may be increased and the intraband overlap may be decreased utilizing a non-rectangular print position grid pattern. The difficulty with such patterns, however, is that a printed horizontal line tends to have a saw tooth appearance which detracts markedly from the printed image.

By equating the two equations given above, one obtains:

$$S_H/S_V = K(n \pm 1/M)(S_V/C)$$

If $S_H \neq S_V$, the range of possible jet row orientations is increased substantially. It will be recognized that this implies a non-square print position grid pattern. While such a pattern is perfectly acceptable, it is preferable if the ratio $S_H/S_V$ is not too much greater than or less than one, however, so that the image resolution in the vertical and horizontal directions do not differ markedly.

Figure 5:
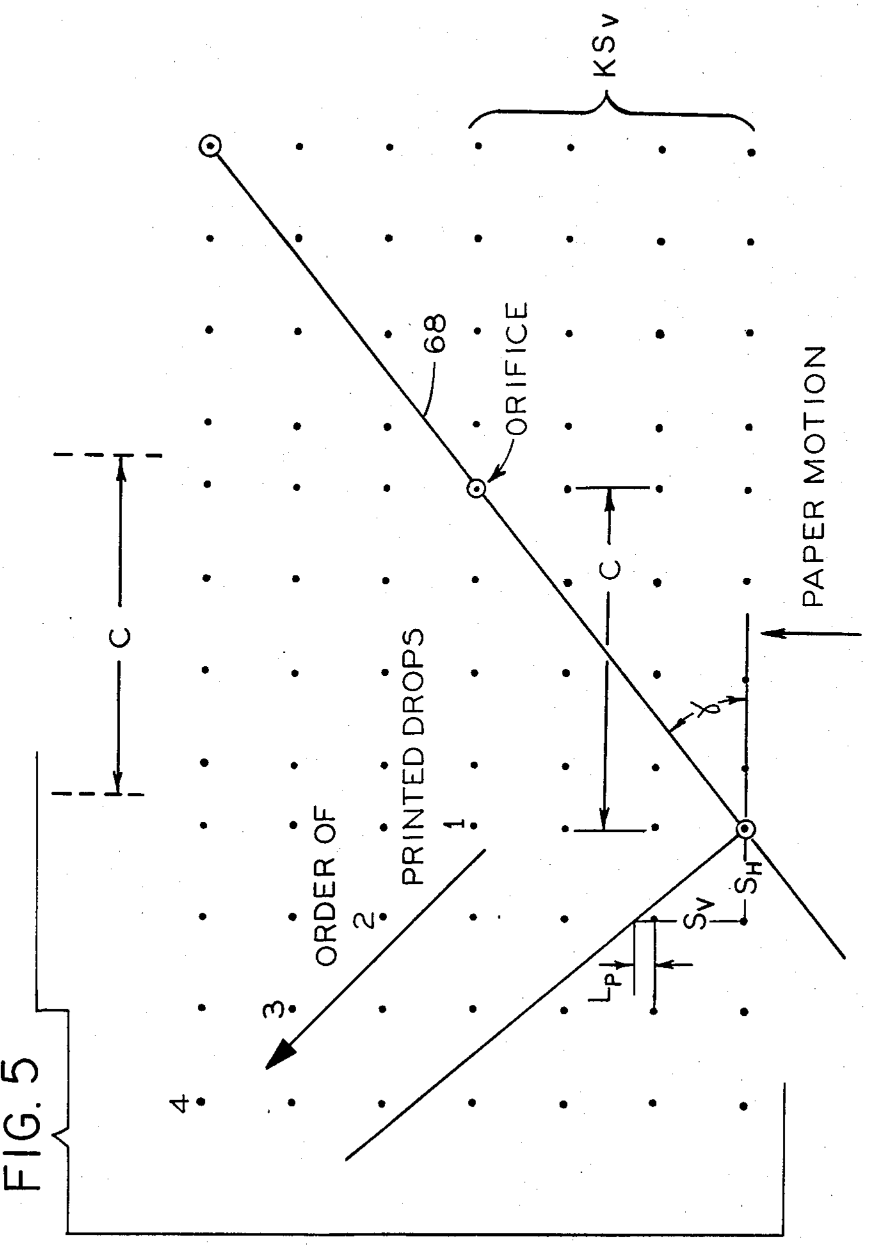
FIGS. 5 and 6 are enlarged plan views of the non-linear rectangular grid pattern in which the drops are placed on the print receiving medium, illustrating the configurations in which the direction of movement of the print receiving medium corresponds to the direction in which print positions are sequentially serviced by each jet.
Figure 6:
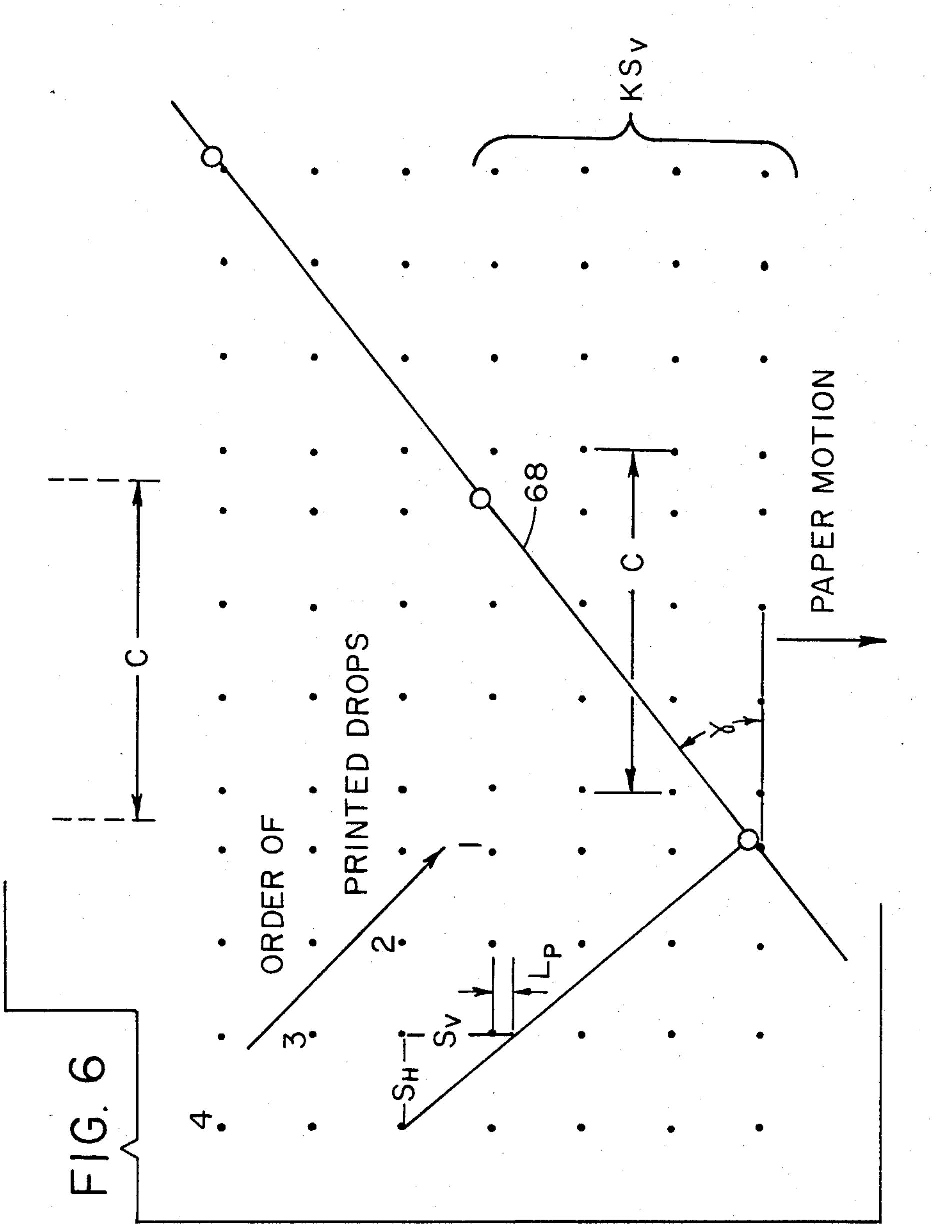
Figure 7:
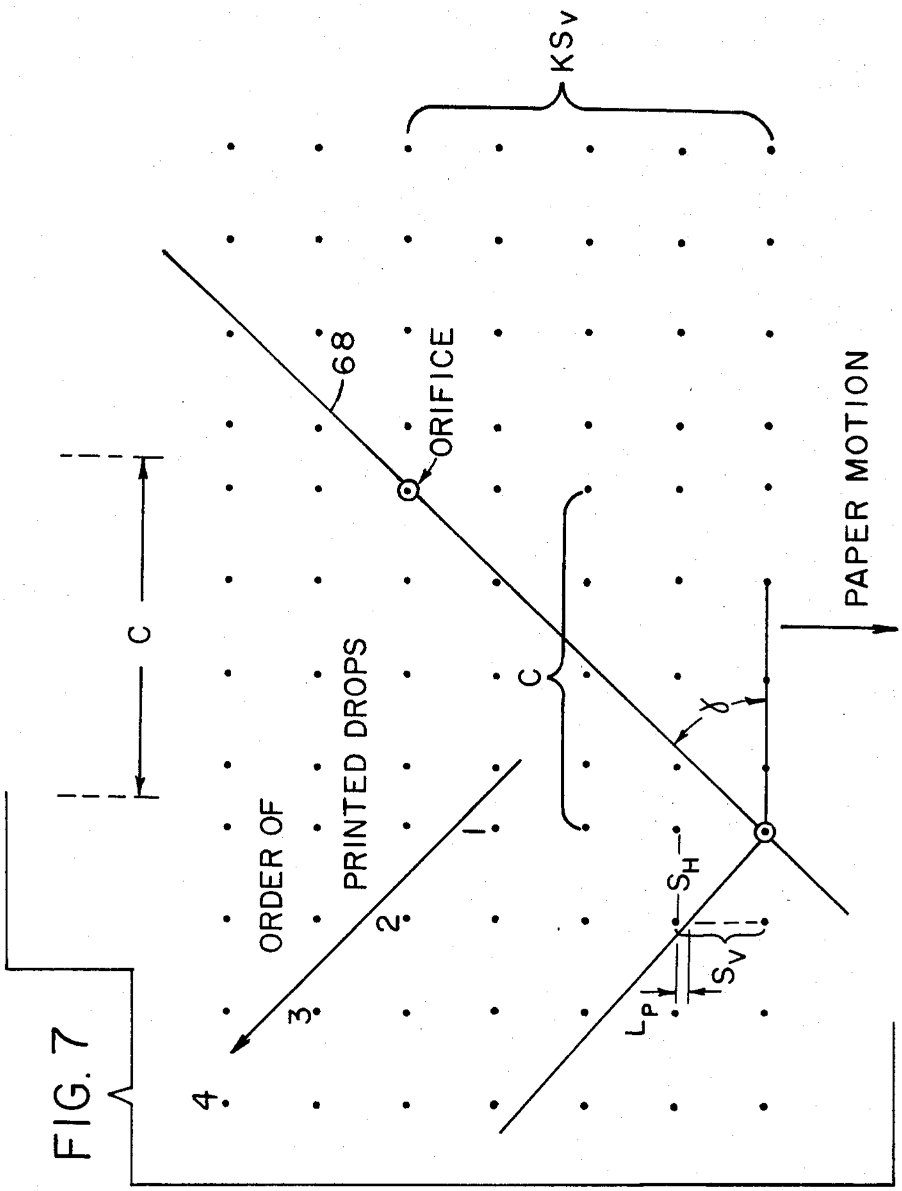
FIGS. 7 and 8 are enlarged plan views of the non-linear rectangular grid pattern, similar to FIGS. 5 and 6, illustrating the configurations in which the direction of movement of the print receiving medium is generally opposite to the direction in which print positions are sequentially serviced by each jet.
Figure 8:
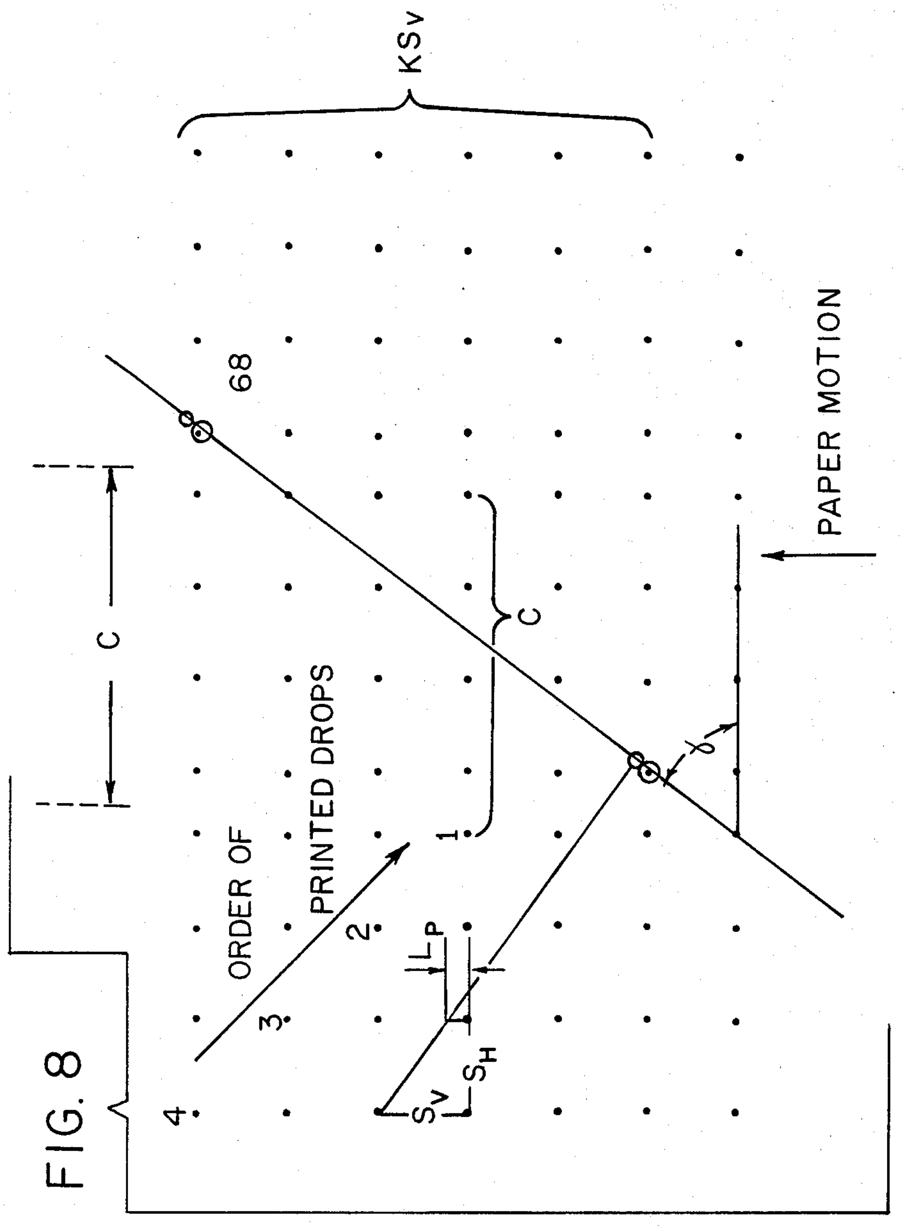

In the above equations the $\pm$ signs are related to the specific system configurations and specifically depend on the direction of paper motion and the order of printing the deflected ink drops. For example, FIGS. 5 and 6 illustrate the cases in which the direction in which print positions are serviced in succession is generally the same as the direction in which the print receiving medium moves past the row of jet drop streams. In FIG. 5, the print positions are serviced in the order 1, 2, 3, 4 and the direction of movement of the medium is generally upward. Similarly in FIG. 6, the print positions are serviced in the order 4, 3, 2, 1 and the direction of movement of the medium is generally downward. In both of these cases, a plus sign is utilized in the equations. On the other hand, in the situations shown in FIGS. 7 and 8 a minus sign is utilized in the equations.

The amount of band overlap B.O. is determined by:

$$B.O. = D_S - [C - (M-1)S_H],$$

where $D_S$ is the diameter of a dot printed at a print position by the deposit there of one or more drops.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An ink jet printer for printing a print image on a moving print medium by selectively depositing ink drops at a plurality of print positions arranged in a rectangular grid on the medium such that a plurality of print lines are formed on said medium, comprising:

means for generating a plurality of jet drop streams directed toward the print medium, said streams arranged in a jet row which is skewed with respect to the direction of movement of the moving print medium, means for selectively deflecting drops from each jet drop stream perpendicular to said jet row to a plurality of print positions in an associated band of print positions, thereby printing along a band of print lines, with drops deposited along adjacent print lines by adjacent jets overlapping more than drops deposited along adjacent print lines by the same jet, said rectangular grid arranged such that:

$$S_H/S_V=K(n\pm 1/M)(S_V/C), \text{ and } S_V\neq S_H,$$

where $S_H$=horizontal displacement between adjacent print positions in a band;

$S_V$=vertical displacement between adjacent print positions in a print line;

M=number of print positions serviced by each jet drop stream;

n=number of rows of print positions between print positions successively serviced by each jet, plus 1;

K=vertical displacement between adjacent jet drop streams divided by $S_V$; and

C=horizontal displacement between adjacent jet drop streams.

2. The ink jet printer of claim 1 in which said means for selectively deflecting drops from each jet drop stream comprises:

charge electrode means for selectively charging each of said drops to one of a plurality of charge levels, including a catch charge level, in response to charging signals;

means for generating an electrical deflection field for deflecting drops, catcher means for catching the drops having a catch charge level, and means for supplying charging signals to said charge electrode means such that drops will be appropriately deflected to form collectively the desired print image.

3. An ink jet printer, comprising:

a print medium, means for transporting said print medium, means for generating a plurality of parallel jet drop streams directed at said moving print medium, said streams arranged in a jet row inclined with respect to the direction of movement of said medium, means for selectively charging each drop in said jet drop streams to one of a plurality of charge levels, and means for deflecting charged drops in each of said plurality of drop streams in a direction perpendicular to said jet row to print positions in an associated one of a plurality of groups of adjacent print positions on said medium, said print positions being arranged in a rectangular grid with the displacement between adjacent print positions serviced by a stream in a direction perpendicular to medium movement being greater than or less than the displacement between adjacent print positions in a direction parallel to medium movement, and with the displacement between adjacent print positions serviced by a stream in a direction perpendicular to medium movement being greater than the displacement between adjacent print positions serviced by adjacent streams.

4. An ink jet printer for depositing drops of ink on a moving print medium at print positions such that a print image is formed on the print medium, with the drops deposited at each print position defining a print line, comprising:

means for generating a plurality of jet streams, said jet streams being evenly spaced along a jet row, means for moving said print medium relative to said jet row such that the direction of movement of said print medium is oblique with respect to said jet row, and means for selectively deflecting drops in each of said jet streams to a plurality of print positions in a direction which is perpendicular with respect to said jet row, whereby a plurality of said print lines on said print medium are serviced by each jet stream and a number of the print lines serviced by each jet stream overlap those serviced by adjacent jet streams, and whereby the drops are deposited on the medium in a rectangular pattern with the spacing between drops along a print line differing from the spacing between adjacent print lines serviced by a single jet stream, and with the spacing between adjacent print lines serviced by a single jet stream being greater than the spacing between adjacent print lines serviced by different jet streams.

5. The ink jet printer of claim 4 in said means for selectively deflecting drops includes means for selectively charging drops in said jet streams to a plurality of M print charge levels, each print charge level corresponding to an associated print position serviced by each jet stream.

6. The ink jet printer of claim 5 in which the amount of overlap B.O. between adjacent print lines serviced by adjacent jet streams is defined by:

$$B.O.=D_S-[C-(M-1)S_H],$$

where $D_S$=the diameter of a dot formed by depositing one or more drops at a print position; C=the distance in a direction perpendicular to the direction of movement of the medium between adjacent jet streams; and $S_H$=the distance between adjacent print positions serviced by a single jet stream in a direction perpendicular to the direction of movement of the medium.

7. The ink jet printer of claim 6 in which the ratio between $S_H$ and $S_V$, the distance between adjacent print positions within a print line, is defined by:

$$S_H/S_V=K(n\pm 1/M)(S_V/C)$$

where K=an integer defining the number of integer $S_V$ spacings between adjacent jet streams in a direction parallel to the direction of movement of the medium; n=an integer defining the number of integer $S_V$ spacings between print positions serviced sequentially by a single jet stream; and the sign of 1/M is a plus if print positions are successively serviced by each jet stream generally in the direction of medium movement and a minus if print positions are successively serviced by each jet stream generally opposite to the direction of medium movement.

8. The ink jet printer of claim 5 in which said means for selectively deflecting drops further includes means for providing a static electrical deflection field through which said jet streams pass, said field being substantially perpendicular to said jet stream row.

9. The ink jet printer of claim 8 in which said means for selectively deflecting drops further comprises a drop catcher extending parallel to said row for catching drops which are not to be deposited on said medium.

10. The ink jet printer of claim 9 in which the angle $\gamma$ of said row with respect to an imaginary line perpendicular to the direction of medium movement is defined by:

$$\gamma=\tan^{-1}[S_H/S_V(n+1/M)]$$

and $$\gamma=\tan^{-1}(KS_V/C).$$

* * * * *